United States Patent [19]
DiChiara

[11] 3,885,291
[45] May 27, 1975

[54] METHOD OF REBUILDING A WORN CAM SURFACE

[76] Inventor: Anthony J. DiChiara, 133-03 128th St., South Ozone Park, N.Y. 11420

[22] Filed: Dec. 7, 1973

[21] Appl. No.: 422,932

[52] U.S. Cl. ............... 29/401; 29/525; 29/DIG. 1; 156/98
[51] Int. Cl. ............................................. B23p 7/00
[58] Field of Search ................. 74/567; 156/94, 98; 29/401, DIG. 1, 402, 530, 525

[56] References Cited
UNITED STATES PATENTS

| | | | |
|---|---|---|---|
| 2,415,905 | 2/1947 | Overton | 29/402 X |
| 3,419,949 | 1/1969 | Huebner | 29/401 |
| 3,449,815 | 6/1969 | Jones et al. | 29/401 |
| 3,755,876 | 9/1973 | Beasley | 29/401 |

Primary Examiner—Richard J. Herbst
Assistant Examiner—D. C. Reiley, III
Attorney, Agent, or Firm—E. Janet Berry; Lawrence Rosen

[57] ABSTRACT

A method and apparatus for rebuilding a cam is accomplished by forming a recess at the worn cam areas. The recess has a depth and length of cut so as to encompass and denude the worn areas from the cam. Wear-strip insert means are provided with one face thereof preformed to have a contour matching the original contour of the cam area before it became worn. Preferably, the wear-strips will comprise a brittle metallic material and have a hardness greater than the cam. The wear-strip insert has a thickness and length equal to the respective depth of cut and length of the recess. The wear-strip is positioned in the recess. Means are provided for securing the wear-strip within the recess so that its preformed face meets the adjacent unworn cam areas without presenting elevational discontinuities therewith.

7 Claims, 3 Drawing Figures

FIG. 1.
FIG. 2.
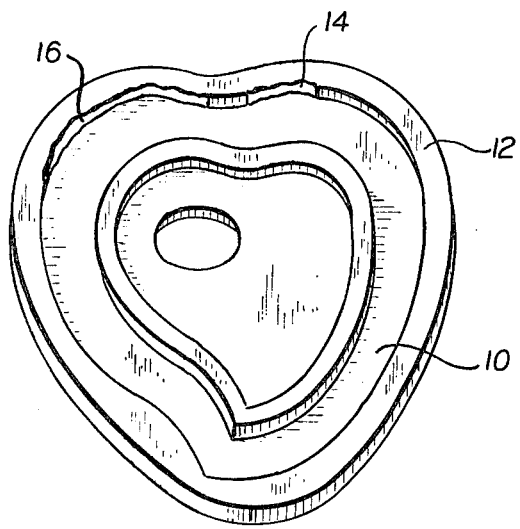
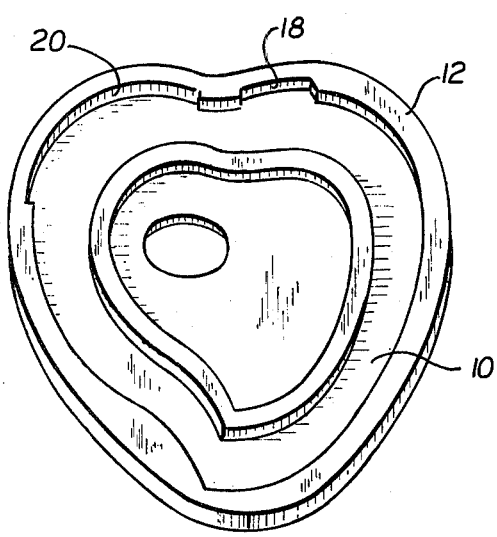
FIG. 3.
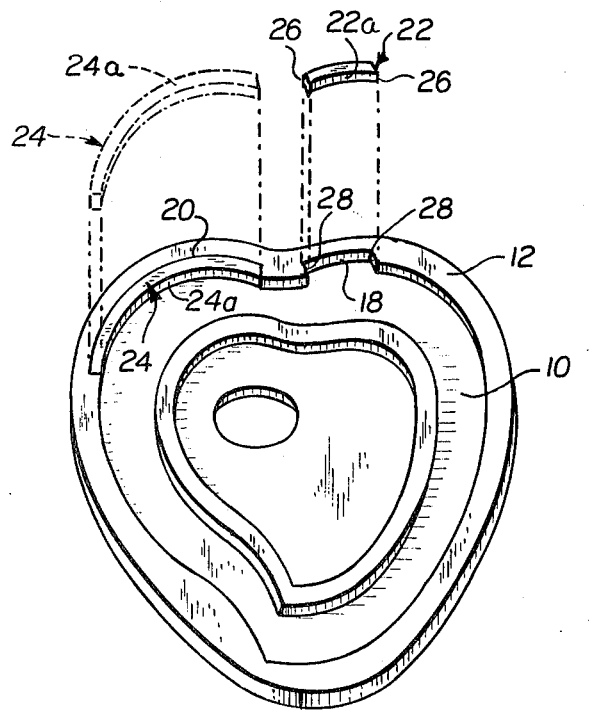

METHOD OF REBUILDING A WORN CAM SURFACE

This invention relates to cams and more particularly to a method and appratus for repairing cam surfaces.

In machine apparatus cams or cam control surfaces are used to guide cam followers. The movement of the cam follower on the cam or control surface produces a frictional force that retards relative motion therebetween. The change of mechanical energy produced by the relative motion of the follower on the cam control surface results in heat. At the interface between the follower and cam control surface, the heat and relative movement has a deleterious effect which erodes areas or portions of the cam control surface. The erosion or abrasion of the cam control surface is, in part, a function of the magnitude of the frictional forces existing at the interface. Erosion obviously changes the dimensions of the cam control surface so that the cam follower will exhibit resulting motion different than that which would be produced if the cam control surface remained dimensionally unchanged.

The combination of forces exerted by and against the cam control surface will depend, in part, on the cam control profile or surface contour of the cam control surface. The component of frictional force varies in accordance with the normal force existing on the cam control surface. The designed variation of cam profile or contour may, for example, cause some portions of the cam or cam control surface to wear an inordinate amount in relation to other portions of the same.

When the degree of wear of either a portion of, or all of the cam control surface becomes sufficiently large to cause cam follower motion to exceed predetermined limits, it has heretofore been necessary to remove the entire cam and replace it. The cost involved in this procedure can be considerable. Cams or cam control surfaces are usually accurately formed or machined members. Yet although various portions of the cam or cam control surface remain substantially dimensionally unchanged, since they experience reduced frictional forces when compared with other portions, it has been necessary to discard the entire cam.

Accordingly, the present invention overcomes the waste and cost involved in requiring the discard of the entire cam.

Generally, the present invention contemplates the removal of the entire cam or cam control surface and its supporting structure from the machine, and rebuilding the worn or eroded cam portions. Rebuilding is accomplished, in the preferred embodiment, by milling recesses at those portions of the cam surface that are worn or eroded. One or a plurality of preformed wear-strips are then inserted in the milled recesses. The wear-strips will preferably have a hardness greater than the material comprising the adjacent cam control surface. One face of inventive wear-strips is preformed to the original contour of the cam control surface with which it is designed to replace. Hence, as the wear-strips seat in the milled recesses, the preformed faces thereof smoothly merge as a portion of the original cam control surface.

By utilizing the inventive wear-strip inserts it is possible to simply and economically replace the same as abrasion causes their erosion. Once the recesses are milled or otherwise placed on the worn portions of the cam, as noted above, it is then only necessary to replace the worn wear-strip insert. The present invention locates the abrasion resistant wear-strip at the points of highest contact stress between the cam and cam follower, yet permits other portions of the cam to remain constructed of the less expensive and more easily machined softer metals such as cast iron. Since it would be impractical and expensive to construct a cam entirely of a brittle metallic material, for example, martensitic stainless steel, the inventive device combines the desired abrasion resistance of brittle materials in the form of the inventive wearstrips, with the economical and readily workable softer metals to provide a cam that will far outlast cams of the prior art.

It is therefore an object of the present invention to provide means for rebuilding worn portions of a cam.

It is another object of the present invention to provide a cam rebuilding means that employs a preformed insert that exhibits a greater resistance to wear than the worn portions of the cam control surface it is designed to replace.

It is a further object of the present invention to provide a cam rebuilding means that is easy to install and use.

It is a still further object of the present invention to provide a method of rebuilding worn cam surfaces that is a simple operation and inexpensive to perform.

Other objects and features of the present invention will become apparent from the following detailed description considered in connection with the accompanying drawings. It is to be understood however, that the drawings are designed for the purpose of illustration only and not as a definition of the limits of the invention.

In the drawings wherein similar reference characters denote similar elements throughout the several views:

FIG. 1 is a perspective view of worn cam areas;

FIG. 2 is a perspective view similar to that shown in FIG. 1 indicating the milled recesses according to the present invention formed at the worn cam areas; and FIG. 3 is an exploded perspective view of the inventive preformed wear-strip inserts showing them adapted to seat in the milled recesses of FIG. 2 with one seated therein and another removed therefrom for the purposes of clarity.

Referring now to FIGS. 1 and 2 there is shown a cam control plate 10 carrying a cam or cam control surface 12. Cam 12 contains worn or eroded areas 14 and 16. The location of worn areas or portions 14 and 16 are illustrative only, it being understood that their location and size will vary according to the frictional forces developed between cam control surface 12 and a cam follower, the cam follower not shown. Since the combination of forces will vary as above noted, it is expected that the action of the cam follower on the cam control surface produces areas experiencing larger frictional forces where contact pressure between follower and cam is highest. This gives rise a surface fatigue that eventually results in the cam erosion or worn areas 14 and 16 as shown.

According to the present invention to rebuild worn areas 14 and 16, recesses 18 and 20 are formed onto, preferably by milling or cutting, control surface 12 at the locations of respective worn areas 14 and 16. Each recess 18 and 20 is cut sufficiently deep into cam 12 so as to denude worn areas 14 and 16 therefrom. Thus, recess 18 encompasses worn portion 14 and recess 20 encompasses worn portion 16.

Referring now to FIG. 3 there is shown the preformed wear-strip inserts of the present invention. Wear strip 22 is shown removed from control surface 12. Wear strip 22 is shown removed from control surface 12. Wear strip 22 is shown in place control surface 12, and its shape is illustrated in phantom, removed from surface 12. Each wear-strip 22 and 24 will preferably be comprised of a brittle metallic material. This will insure that the insert exhibits a greater resistance to abrasion than the surrounding and adjacent cam material. However, it is understood that the invention is not limited to brittle material since it is possible to substitute softer metals or indeed even plastics or ceramics. Each wear strip 22 and 24 is supplied with a preformed face respectively 22a and 24a. Each face 22a and 24a is formed to match a respective portion of the original contour of the cam control surface before associated portions thereof were transformed into worn areas 14 and 16.

Referring back to FIG. 2 and viewing FIG. 3 it will be seen that the depth of cut of recess 18 equals the edge thickness of wear-strip 22. And, the depth of cut of recess 20 likewise equal the edge thickness of wear-strip 24.

The depth of cut of each recess placed on the cam or cam control surface at the location of the worn areas is such as to permit each wear-strip 22 and 24 to be carried on the cam control surface so that each preformed face thereof, 22a and 24a, meets adjacent cam surface areas without presenting elevational discontinuities therewith.

The length of wear-strips 22 and 24 is cut so as to approximately equal the length of associated recesses 18 and 20. This permits an interference fit between the former pair 22 and 24 and respective recesses 18 and 20. Consequently, inserts 22 and 24 will be press-fit or frictionally restrained in associated recess 18 or 20. Integration and restraining of wear-strip 22 in recess 18, for example, is accomplished by having the longitudinal edges 26 of wear-strip 22 providing an abutment surface. Corresponding recess side edge portions 28 of recess 18 will be complementary with wear strip side edges 26. This construction allows compression of the wear-strip when the same is press-fit as previously described.

Besides securing each wear-strip insert 22 and 24 in recess 18 and 20 by means of a press-fit, the present invention contemplates interposing adhesive means between and along, for example, the interface between wear strip 22 and recess 18. The adhesive means might comprise an epoxy cement which will securely fasten the insert within the recess. In the event adhesive means are utilized and interposed at the interface of the wear-strip and the recess, the depth of cut of the recess as previously mentioned, will be minutely enlarged so as to compensate for the added thickness caused by imposition of the adhesive layer therebetween. It is also contemplated that counter-sunk screws may be utilized in securing a wear-strip within its associated recess.

While only a single embodiment of the present invention has been shown and described, it will be apparent that many changes and modifications may be made thereto without departing from the spirit and scope of the invention.

What is claimed is:

1. A method of rebuilding a worn section of a cam surface, wherein the worn section comprises less than the entire length of the cam surface, comprising the steps of:

removing the worn section of the cam surface and forming a recess in the cam surface at the location of the worn section, the recess having a predetermined length along the cam surface encompassing the portion of that surface which had been worn and the recess having a predetermined depth into the cam surface that is beneath the depth of the worn cam surface along that worn portion;

forming a replacement wear strip having a length approximately equal to the predetermined length and having a depth approximately equal to the predetermined depth and having an outward surface that is shaped to the shape of the worn section of the cam surface that section of the cam surface had been worn; said wear strip being dimensioned such that when it is emplaced in the recess, the outward surface of the wear strip forms an integral continuation of the adjacent cam surface without presenting elevational discontinuities;

securing the replacement wear strip in the recess such that its outward surface is flush with and forms an integral continuation of the adjacent cam surface without presenting elevational discontinuities.

2. The method of claim 1 wherein the replacement wear-strip is comprised of a brittle material and wherein the cam surface consists of a ductile material.

3. The method of claim 1 wherein said recess forming step is performed by milling the recess at the worn areas.

4. The method of claim 1 wherein said recess forming step is performed by abrasively cutting the recess at the worn areas.

5. The method of claim 1 wherein said step of securing is accomplished by interposing an epoxy cement layer at the interface between the replacement wear-strip and the recess.

6. The method of claim 5, wherein the predetermined length and depth of the recess are increased by the thickness of the epoxy cement layer.

7. The method of claim 1, wherein the replacement wear strip has said predetermined length of the recess such that the replacement wear strip is frictionally restrained and press fit in the recess.

* * * * *